United States Patent [19]
Takahashi et al.

[11] 4,087,969
[45] May 9, 1978

[54] HYDRAULIC SPEED CHANGE GEAR HAVING AN AUTOMATIC PRESSURE CONTROL DEVICE

[75] Inventors: Noriyuki Takahashi, Tokyo; Masao Nishikawa, Niiza, both of Japan

[73] Assignee: Honda Giken Kogyo Kabushiki Kaisha, Tokyo, Japan

[21] Appl. No.: 775,322

[22] Filed: Mar. 7, 1977

[30] Foreign Application Priority Data

Mar. 9, 1976 Japan .................................. 51/25279

[51] Int. Cl.² .......................... F15B 9/14; F15B 11/16
[52] U.S. Cl. ........................................ 60/464; 60/468; 60/488
[58] Field of Search ................. 60/459, 464, 468, 488, 60/494, 465

[56] References Cited

U.S. PATENT DOCUMENTS

| | | | |
|---|---|---|---|
| 2,425,496 | 8/1947 | Tyler | 60/464 X |
| 2,961,829 | 11/1960 | Weisenbach | 60/464 |
| 3,153,900 | 10/1964 | Pigeroulet | 60/468 X |
| 3,359,727 | 12/1967 | Hann et al. | 60/465 X |
| 3,734,225 | 5/1973 | Kobald et al. | 60/488 X |

*Primary Examiner*—Edgar W. Geoghegan
*Attorney, Agent, or Firm*—Haseltine, Lake & Waters

[57] ABSTRACT

A hydraulic speed change gear designed to automatically control its hydraulic circuit pressure to be held at all times at a substantially constant level irrespective of the loading condition so as to enable the pressure oil in the hydraulic circuit to be used as a pressure source for other various hydraulic equipment. To this end, the gear includes a fixed displacement hydraulic pump adapted to be driven by an input shaft, a variable displacement hydraulic motor having an output shaft, a closed hydraulic circuit connecting between said pump and said motor, a hydraulic supply pump drivably coupled to said input shaft, a supply passage connected with a discharge port of said supply pump and with said closed hydraulic circuit through check valves, and an oil pressure control device connected with said closed hydraulic circuit and said supply passage for reducing the oil pressure in said supply passage in proportion to a pressure rise in said closed hydraulic circuit.

3 Claims, 2 Drawing Figures

HYDRAULIC SPEED CHANGE GEAR HAVING AN AUTOMATIC PRESSURE CONTROL DEVICE

BACKGROUND OF THE INVENTION

This invention relates to a hydraulic speed change gear of the type which includes a fixed displacement hydraulic pump adapted to be driven by an input shaft and a variable displacement hydraulic motor having an output shaft, the motor being connected with the pump by means of a closed hydraulic circuit such that the speed change ratio between the output shaft and the input shaft is controllably varied steplessly by regulating the capacity of the motor.

When a hydraulic speed change gear of the kind as referred to above is used on an automotive vehicle, the closed hydraulic circuit may be utilized as an oil pressure source for various hydraulically operated equipment, such as a power steering system, a brake servo motor, and the like for the purpose of eliminating an expensive hydraulic pump for the exclusive use of the hydraulic equipment. In such case, however, oil pressure in the closed hydraulic circuit is generally subjected to variations in the loading conditions of the speed change gear, so that it becomes necessary for the proper operation of the hydraulic equipment to correct the pressure variations in the closed hydraulic circuit so as to maintain the circuit pressure at any time at a practically constant level.

SUMMARY OF THE INVENTION

Accordingly, the primary object of the present invention is to provide a novel hydraulic speed change gear of the kind described which is highly effective to satisfy the aforementioned requirement.

To this end, according to the invention, it is proposed to provide a hydraulic speed change gear of the above kind with pressure control means for controlling the oil pressure in the hydraulic circuit of the gear to be held at all times at a practically constant level.

The above and other objects, features and advantages of the invention will become more apparent from the following detailed description of the invention, when taken in conjunction with the accompanying drawing, which illustrates one exemplary preferred embodiment according to the principles of the invention.

BRIEF DESCRIPTION OF THE ACCOMPANYING DRAWING

DESCRIPTION OF THE PREFERRED EMBODIMENT

Figure 1:
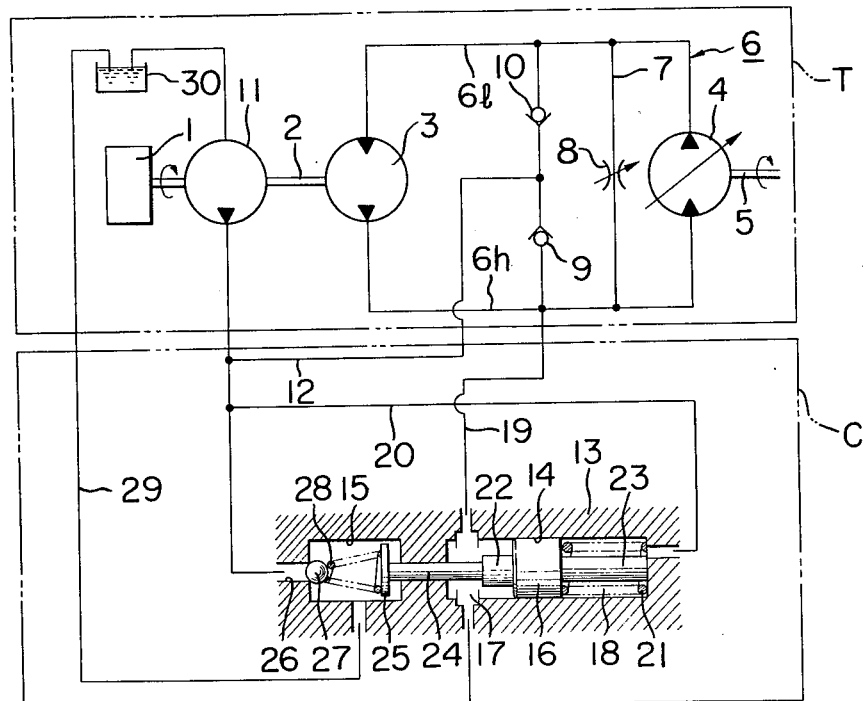
FIG. 1 is a diagramatic view schematically illustrating the hydraulic circuit arrangement of a hydraulic speed change gear including pressure control means and its associated elements.

In the drawing, there is schematically illustrated a hydraulic speed change gear, generally indicated at T, which is adapted to be mounted on automobile vehicles, and which includes a fixed displacement hydraulic pump 3 drivably coupled to an input shaft 2 of an engine 1, and a variable displacement hydraulic motor 4 having an output shaft 5, these pump and motor being arranged in aligned relation with each other and hydraulically connected with each other by means of a closed hydraulic circuit 6. The circuit 6 includes a high pressure passage 6h connecting between a discharge port of the hydraulic pump 3 and a feed port of the hydraulic motor 4, and a low pressure passage 6l connecting between an exhaust port of the hydraulic motor 4 and the inlet of hydraulic pump 3, these high and low pressure passages being connected with each other by way of a short-circuiting passage 7 with a variable throttle valve 8 acting as a clutch disposed therein. The high and low pressure passages 6h, 6l are connected respectively with a supply passage 12 leading through check valves 9, 10 to a discharge port of a supply pump 11, which is driven by the engine input shaft 2.

C is an oil pressure control to control the oil pressure in said high pressure passage 6h to be practically fixed, its control proper 13 having a cylinder 14 and a valve chamber 15 laterally adjacent to each other. A pressure receiving piston 16 is slidably fitted into said cylinder 14 to divide the inside thereof into a left and a right chamber 17, 18, said left chamber 17 being connected to said high pressure passage 6h through an oil pressure detection passage 19 and said right chamber 18 being connected to said supply passage 12 through a feedback passage 20, with a return spring 21 to spring said pressure receiving piston 16 leftward compressedly installed in said right chamber 18. On each end of said pressure receiving piston 16, a stopper 22, 23 is provided integrally therewith which is able to come in contact with each end wall of said cylinder 14 so as to limit the sliding stroke of said piston 16, and a piston rod 24 provided on said stopper 22 is projected into said valve chamber 15, with a spring seat 25 provided on its front end. In that end wall of said valve chamber 15 opposing said spring seat 25 opens a valve port 26 connected to said supply passage 12, with a relief valve 27 provided therein, and between said valve 27 and spring seat 25 a pressure regulating spring 28 is compressedly installed. A spring weaker in the spring force than said return spring 21 is used as said pressure regulating spring 28. And, said valve chamber 15 is connected through a relief passage 29 to an oil sump 30.

a to d are various hydraulically operated equipment of a vehicle, such as a power steering system, a brake servo motor, etc., which are connected to said left chamber 17 through an oil pressure outlet passage 32 with a reducing valve 31 placed therein or directly to said high pressure passage 6h.

Now, operation of this embodiment is described below:

First, operation of said speed change gear T is as follows: with said variable throttle valve 8 closed, if said hydraulic pump 3 is driven by said input shaft 2, hydraulic oil circulates through said circuit 6, driving said hydraulic motor 4 as it passes therethrough. In this case, by regulating the capacity of said hydraulic motor 4 from the maximum to the minimum, the reduction gear ratio between said input and output shafts 2, 5 can be steplessly controlled from the maximum to the minimum (1:1). And, during such operation, part of hydraulic oil in said high pressure passage 6h is fed through said passages 19, 32 to said hydraulically operated equipment a to d for adequately operating them, and as the result, when said circuit 6 runs low of hydraulic oil, said check valves 9, 10 open, so that oil discharged from said supply pump 11 is fed through said supply passage 12 to said circuit 6, and the same is applicable to the case where hydraulic oil leaks from the sliding parts of said hydraulic motor 4, etc.

Figure 2:
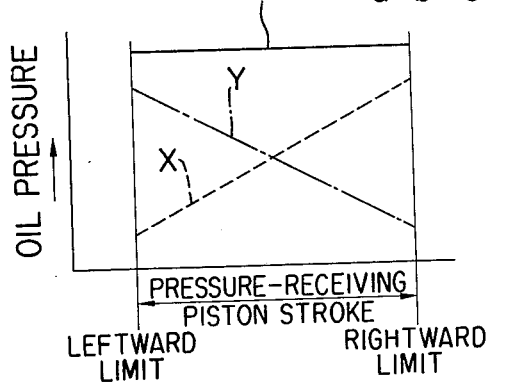
FIG. 2 is a characteristic graph, in which X indicates the oil pressure in the closed hydraulic circuit, Y indicates the oil pressure in the supply passage, and Z indicates the combined oil pressure (X + Y).

Next, operation of said oil pressure control C is as follows: if neither outflow nor replenishment of hydraulic oil occurs in said circuit 6, the oil pressure in the high pressure passage 6h of said circuit 6 rises as shown by the line X in FIG. 2 as the load on said output shaft 5 increases. And the oil pressure in the left chamber 17 of said cylinder 14 connected at all times to said high pressure passage 6h rises similarly. When said oil pressure overcomes the oil pressure in said right chamber 18 (equivalent to the oil pressure in said supply passage 12) and the specified set load of said return spring 21, said pressure receiving piston 16 displaces to the right in FIG. 1, in proportion to the rise of oil pressure in said left chamber 17. Therefore dependent on pressure in passage 6h, 16 moves from the limit of leftward movement to the limit of rightward movement varying the position of said spring seat 25, so that the set load of said pressure regulating spring 28 that determines the valve opening pressure for said relief valve 27 reduces, and as a result, as shown by the line Y in FIG. 2 the oil pressure of said supply passage 12 is the highest when said pressure receiving piston 16 is positioned at the limit of leftward movement and decreases as said piston 16 moves rightward. This characteristic is exactly opposite to the characteristic of the oil pressure X in said high pressure passage 6h. However, in actual operation, while said speed change gear T is operating, hydraulic oil is always supplied from said supply passage 12 to said circuit 6, so that actual oil pressure in said high pressure passage 6h is a combination of said oil pressures X and Y, and as the result, it maintains a fixed value at all times as shown by the line Z in FIG. 2. Consequently, hydraulic oil to be fed from said high pressure passage 6h through said passages 19, 32 to various hydraulically operated equipment a to d is fixed in the oil pressure and is capable of normally operating them independently of variation in the load on said speed change gear T.

As is seen from the foregoing, in accordance with this invention the oil pressure in a supply passage connected through check valves to a hydraulic closed circuit of a hydraulic speed change gear and connecting to a discharge port of a supply pump is made to decrease in proportion to the rise of oil pressure in the hydraulic closed circuit; by this arrangement it makes it possible to automatically correct variation in the oil pressure in the hydraulic closed circuit by the pressure of oil supplied from the supply passage, to maintain the oil pressure in said circuit always at a practically fixed value independently of variation in the load on the speed change gear, and therefore, to utilize it effectively as an oil hydraulic source for various hydraulically operated equipment.

Though one preferred embodiment has been shown and described, it will be apparent to those skilled in the art that various changes and modifications may be made therein without departing from the spirit of the invention and the scope of the appended claims.

What is claimed is:

1. A hydraulic speed change gear comprising a fixed displacement hydraulic pump adapted to be driven by an input shaft, a variable displacement hydraulic motor having an output shaft, a closed hydraulic circuit connecting between said pump and said motor, a hydraulic supply pump drivably coupled to said input shaft, a supply passage connected with a discharge port of said supply pump and with said closed hydraulic circuit through check valves, and an oil pressure control device connected with said closed hydraulic circuit and said supply passage for reducing the oil pressure in said supply passage in proportion to a pressure rise in said closed hydraulic circuit.

2. A hydraulic speed change gear as claimed in claim 1, wherein said supply passage is led through a relief valve to an oil reservoir, said relief valve being normally urged under the resiliency of a pressure-regulating spring to a closed position, and the set load of said spring, determining the valve-opening pressure of said relief valve, is reduced in proportion to a pressure rise in said closed hydraulic circuit.

3. A hydraulic speed change gear as claimed in claim 1, wherein said closed hydraulic circuit is connected with a plurality of hydraulically operated equipment.

* * * * *